(12) United States Patent
Bolduc

(10) Patent No.: US 6,652,232 B2
(45) Date of Patent: Nov. 25, 2003

(54) SELF-TRIMMING OSCILLATING WING SYSTEM

(76) Inventor: Maxime Lambert Bolduc, 27, St-Paul, Riviére-du-Loup, Quebec (CA), G5R 2E5

( * ) Notice: Subject to any disclaimer, the term of this patent is extended or adjusted under 35 U.S.C. 154(b) by 17 days.

(21) Appl. No.: 10/035,207

(22) Filed: Jan. 3, 2002

(65) Prior Publication Data
US 2003/0123983 A1 Jul. 3, 2003

(51) Int. Cl.[7] .................................................. F03B 17/06
(52) U.S. Cl. ............................ 416/24; 416/82; 416/83; 416/DIG. 4
(58) Field of Search ........................ 415/8, 906; 416/23, 416/24, 82, 83, DIG. 4; 290/42, 43, 44, 54, 55

(56) References Cited

U.S. PATENT DOCUMENTS

| 4,184,805 A | * | 1/1980 | Arnold | 416/1 |
| 4,470,770 A | * | 9/1984 | Grose | 417/334 |
| 6,323,563 B1 | * | 11/2001 | Kallenberg, Jr. | 290/42 |

* cited by examiner

*Primary Examiner*—Ninh H. Nguyen

(57) ABSTRACT

The present invention shows an oscillating wing system like lifting surface featuring a symmetrical profile mounted free to rotate over a fixation point located ahead neutral point and self-trimming at angle of attack in the flow by adjustment of a trailing edge elevon, and whose the system is actuated by linear lateral or vertical movement allowing to produce electrical energy with the wind flow or water flow of a deep river or at flood/ebb tide.

4 Claims, 12 Drawing Sheets a)

b)

SELF-TRIMMING OSCILLATING WING SYSTEM

BACKGROUND OF THE INVENTION

1. Field of the Invention

The present invention relates to a self-trimming oscillating wing system allowing to produce electrical energy with the wind flow or water flow of a deep river or at flood/ebb tide.

2. Description of the Related Art

A search of prior art records has unveiled the following patents:

1. No CA 1,336,481 issued in 1995 to Wayne;
2. No CA 555,128 issued in 1958 to Budig;
3. A whale tail ship propulsion system invented by Fowles in 1848; and
4. A whale tail ship propulsion system invented by Johnson in 1862.

The patent to Fowles is probably the most relevant. As can be seen, the patent to Fowles shows a whale tail ship propulsion system, which the whale tail moving up and down at angle of attack, but at a low speed the up and down movement creates an incoming flow perpendicular to the tail plan. The excessive flow separations destroy the lifting while that the engines are overloaded, and by imposing mechanically the incidence to the tail profile, it makes that for many conditions there is the flow separations. The conditions are not the same with a spinning propeller where its rotation normally induces an incoming flow facing the blade leading edge.

The research and development works from "Voith-Schneider" were to adapt the existing cycloidal systems by modifying the blade incidence mechanical linkage. All approaches considered up to now were to force mechanically the blade incidence against flow. The "Voith-Schneider" company and associated scientists or contractors were interested to adapt the whale tail propulsion system implicating some form of blade translation like the sweep of a whale tail to development of their cycloidal propulsion system, but after several years of research no achievement had been realized.

With the proposed system, it is no necessary to use a mechanism rotating in winding for adjust the wing facing the flow because the wing in swivelling can take a reversed flow, so long as the sequence of control movement from the elevon being reversed.

Seeing that the self-trimming oscillating wing system gets its high efficiency from a very large rectangular projected area in the flow, it is more easy to install it into a deep river, and that, because the system uses the flow dynamic pressure of the river, therefore it is no necessary to build the water dams to raise the static pressure.

In the case of tidemills and permanent installations in the deep rivers, the system will be installed so as to allow at the wing to be raised and blocked over the water-area up to underneath the portal. Too, it depends of the deep-water in function of tides, the amplitude and phase middle will be adjusted so as to that the wing does not going out from the water while its operating all in working the maximum of sweeping area totally free.

The self-trimming oscillating wing system is more interesting compared to that of a wind turbine because the heavy alternator and relevant equipments are laid on the ground. These conditions simplify a lot of maintenance, assembling, disassembling operations, compared to the problems associated with a nacelle containing 25 tons of equipment located in a tower at hundred feet over the ground, or of an horizontal axis wind turbine suspended hundred feet in the air.

Alternatively, the oscillating up and down support arrangement is mounted so that each wing can be put down at ground level for the assembling or maintenance. The self-trimming oscillating wing system does not have the aeroelastic and gyroscopic problems of a spinning wind turbine, therefore there is no need to balance the wing with precision.

Seeing that the oscillating wing profile configuration is thick and large compared to high technology fabrication of large wind turbine blade, the wings can be made of a light material still very robust comprising the large hollows covered with a thin plastic material partly inflated to maintain the rigidity.

SUMMARY OF THE INVENTION

The present invention shows an oscillating wing system like lifting surface featuring a symmetrical profile mounted free to rotate over a fixation point located ahead neutral point and self-trimming at angle of attack in the flow by adjustment of a trailing edge elevon, and whose the system is actuated by linear lateral or vertical movement allowing to produce electrical energy with the wind flow or water flow of a deep river or at flood/ebb tide.

The oscillating wing system moving up and down in a linear translation but not in a cycloidal trajectory.

The self-stabilizing wing trims always at same angles of attack related to elevon angles of incidences, whatever the dynamic pressure, the velocity or the direction of incoming flow. Once are determined the wing profile (NACA 0015), the chord ratio of elevon (50%), the static margin of 25% (distance between the wing pivot point and its profile aerodynamic neutral point), there is a predetermined relation almost linear between the elevon angle and the state of equilibrium at which the wing trims.

The oscillating wing profile is totally free to rotate around of its fixation point while that the elevon deflection angle is kept constant with respect to the profile base line. In this case, seeing that the profile is symmetrical, the camber line will be a straight line. The projected area against wind of the oscillating wing has the shape of a large flat rectangle, therefore, the ratio of projected area is larger than that of a wind turbine. It results a lower aerodynamic loading whose the effects combined with the benefits of bidimentional flow provide an efficiency of 20% to 30% higher compared to that of a wind turbine.

ADVANTAGES OF THE INVENTION

Minimum noise and erosion;

It is no necessary to build the water dams to raise the static pressure because the system uses the water flow dynamic pressure;

The installation of the oscillating wing system can be made simply by laying and anchoring the system at the bottom of along of a deep river;

High efficiency at high speed;

The self-trimming oscillating wing system can be installed vertically or horizontally; and The self-trimming oscillating wing system is very promising and competitive compared to that of a wind turbine.

BRIEF DESCRIPTION OF THE SEVERAL VIEWS OF THE DRAWING(S)

DETAILED DESCRIPTION OF THE INVENTION

Figure 1:
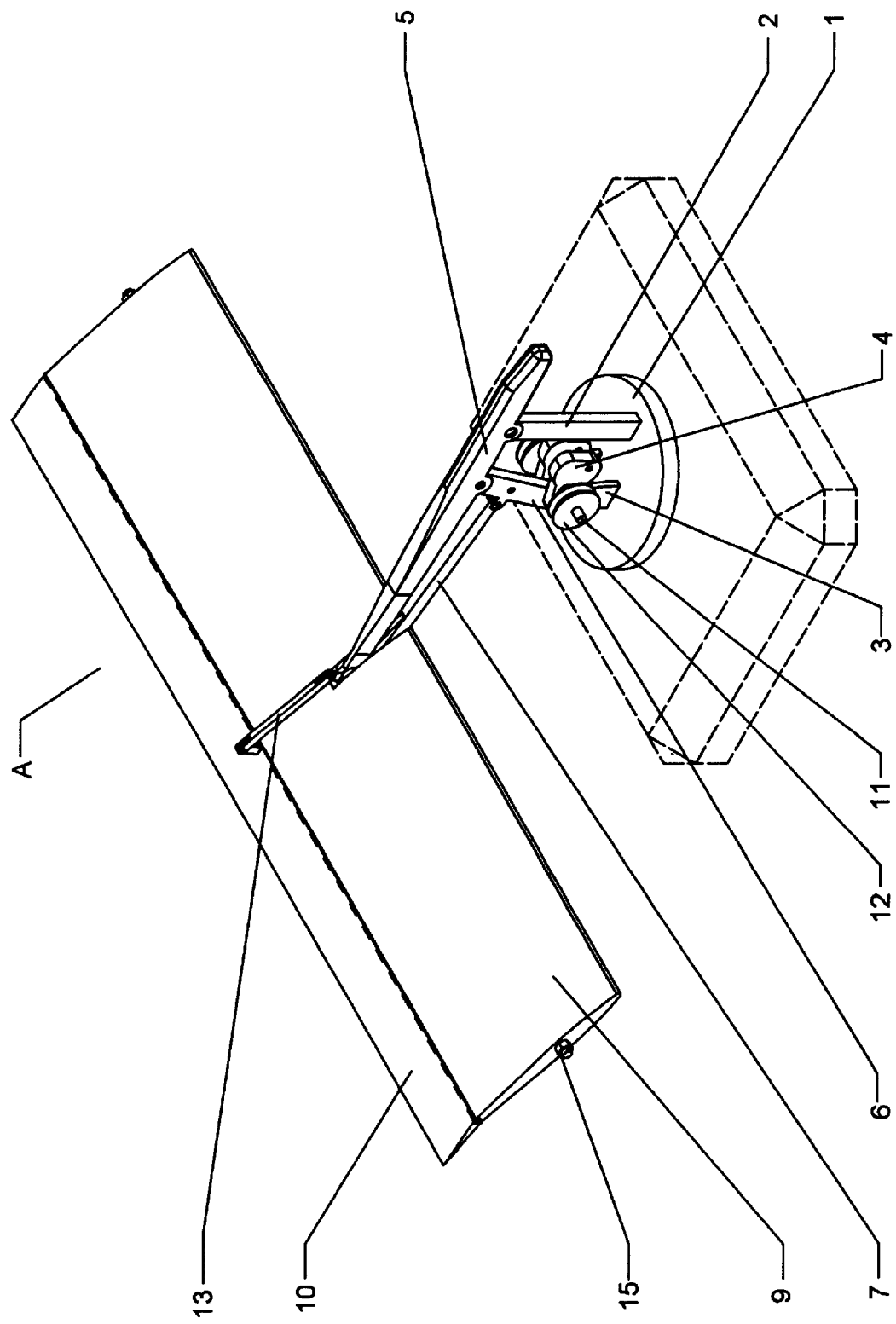
FIG. 1 shows a rear perspective view of a self-trimming oscillating wing system installed onto a base.
Figure 2:
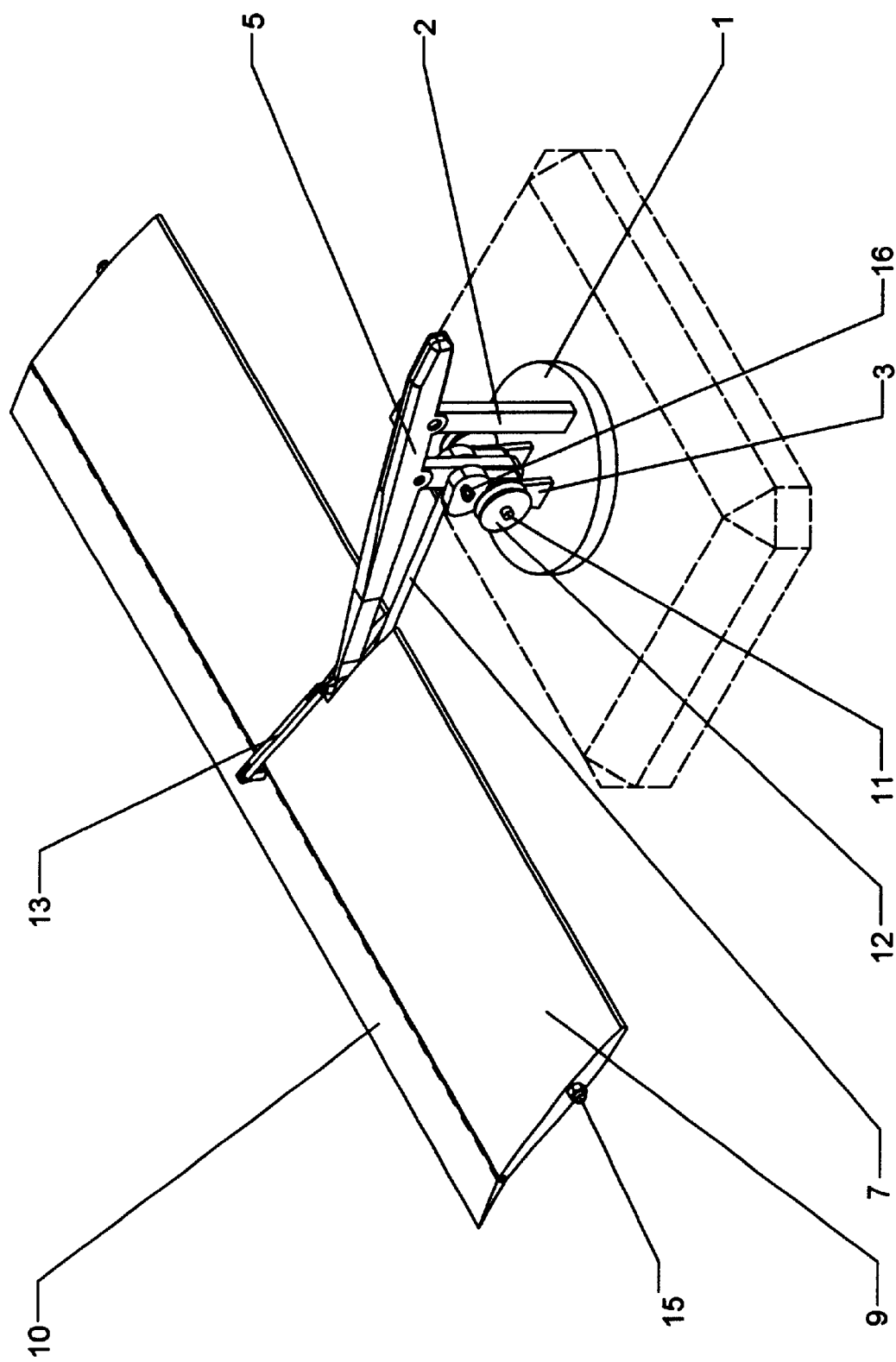
FIG. 2 shows a rear perspective view of self-trimming oscillating wing system blocked in position, and installed onto a base.
Figure 3:
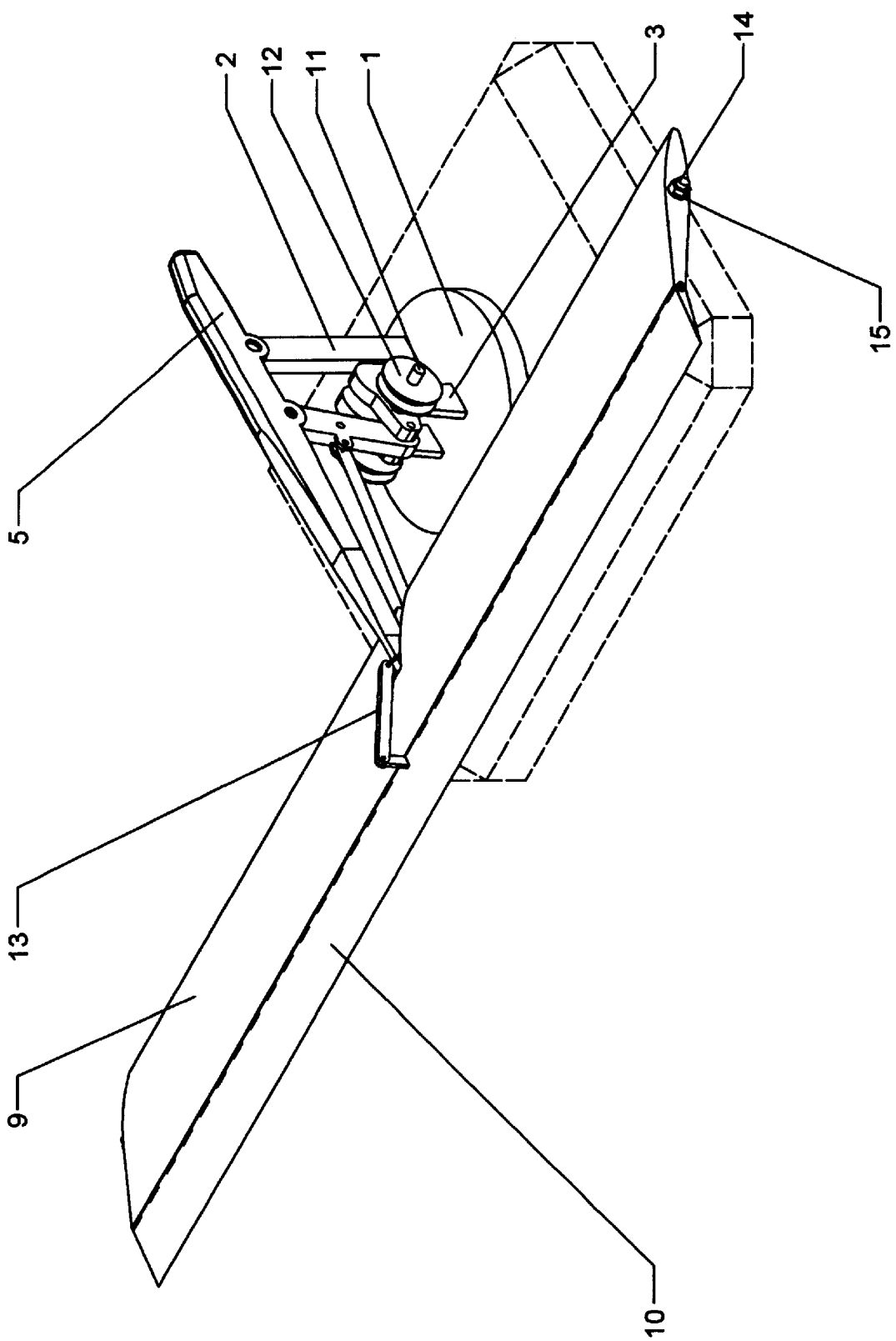
FIG. 3 shows a front perspective view of self-trimming oscillating wing system installed onto a base.
Figure 4:
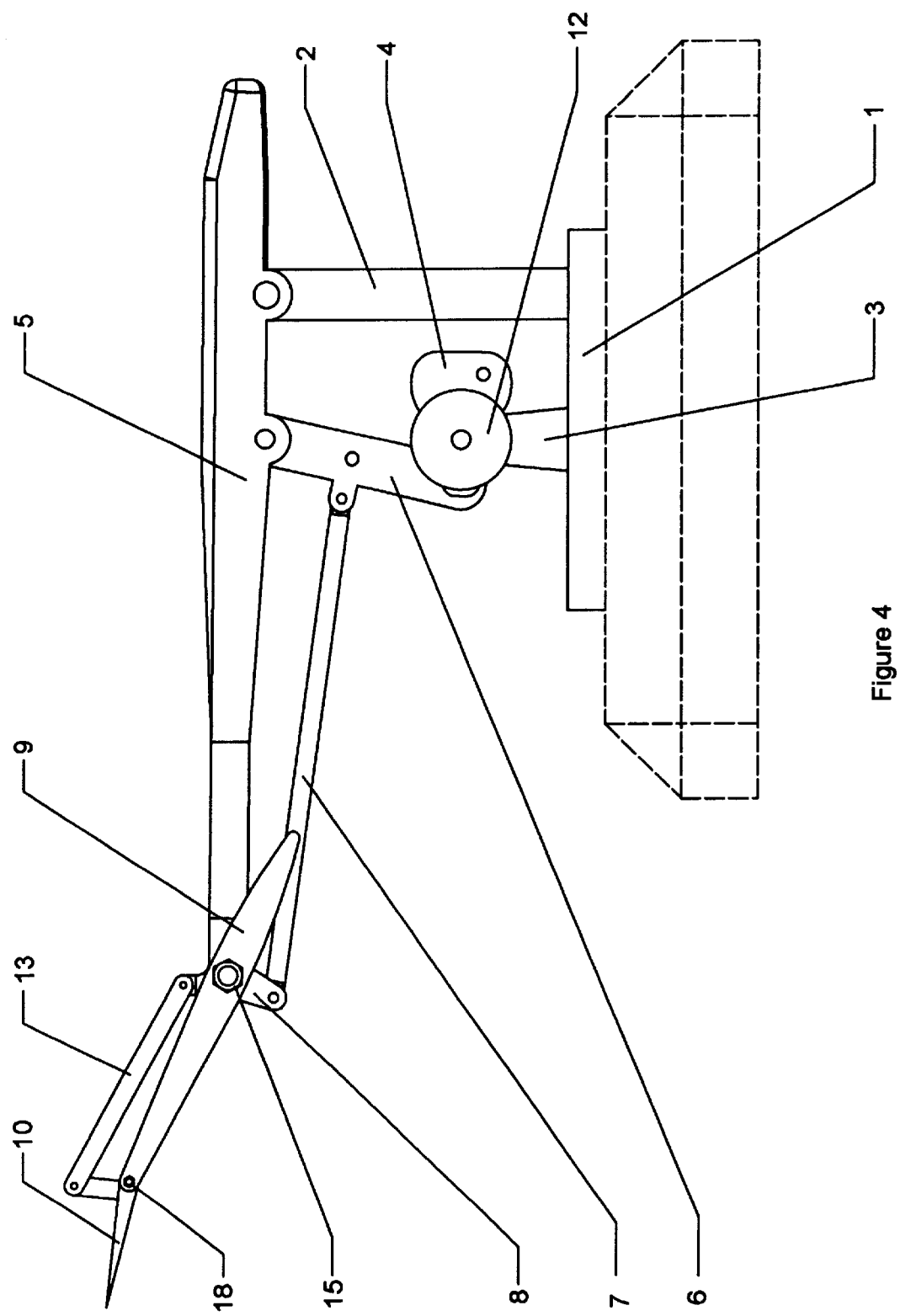
FIG. 4 shows a side view of self-trimming oscillating wing system installed onto a base.
Figure 5:
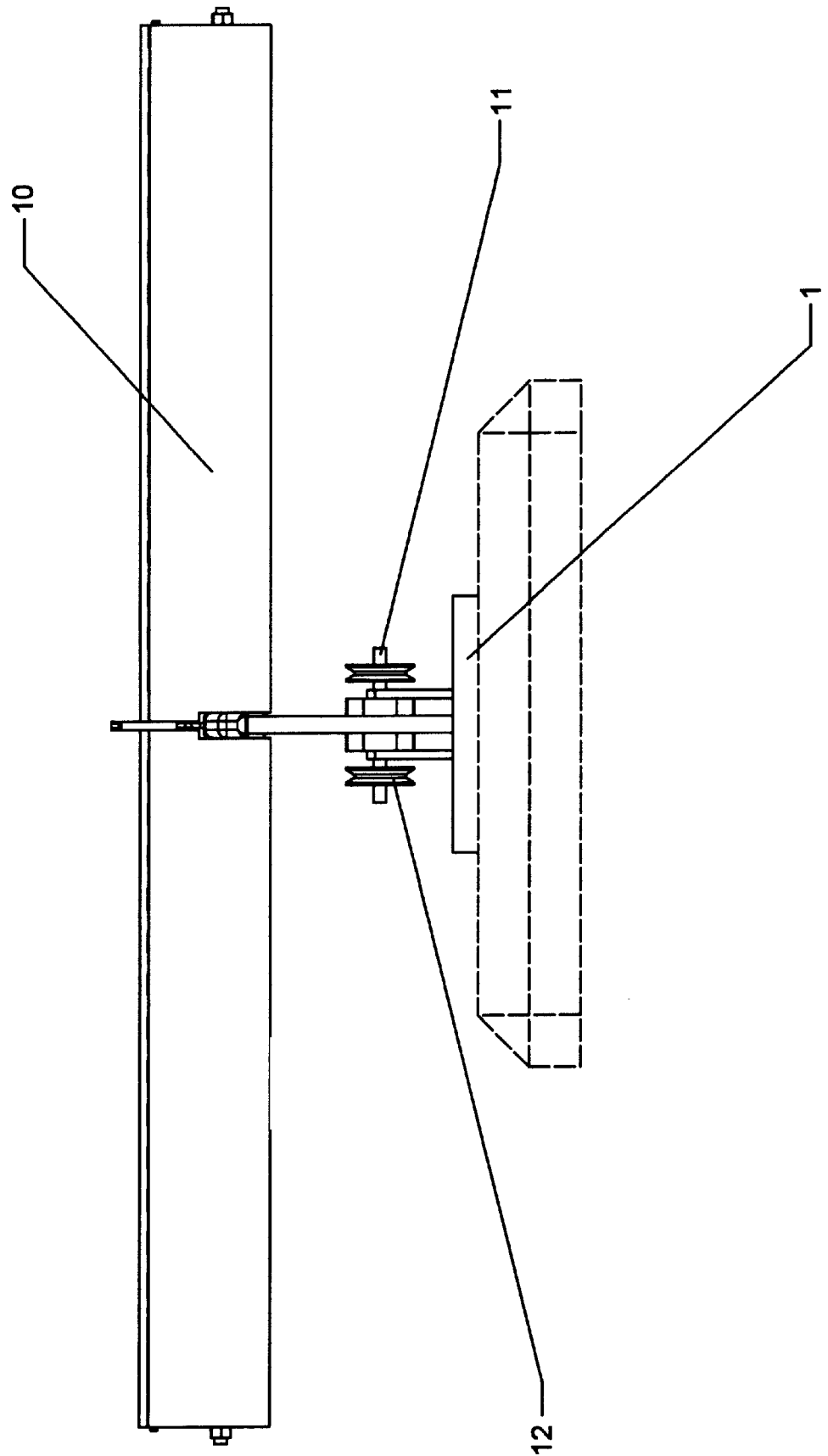
FIG. 5 shows a rear view of self-triming oscillating wing system installed onto a base.
Figure 6:
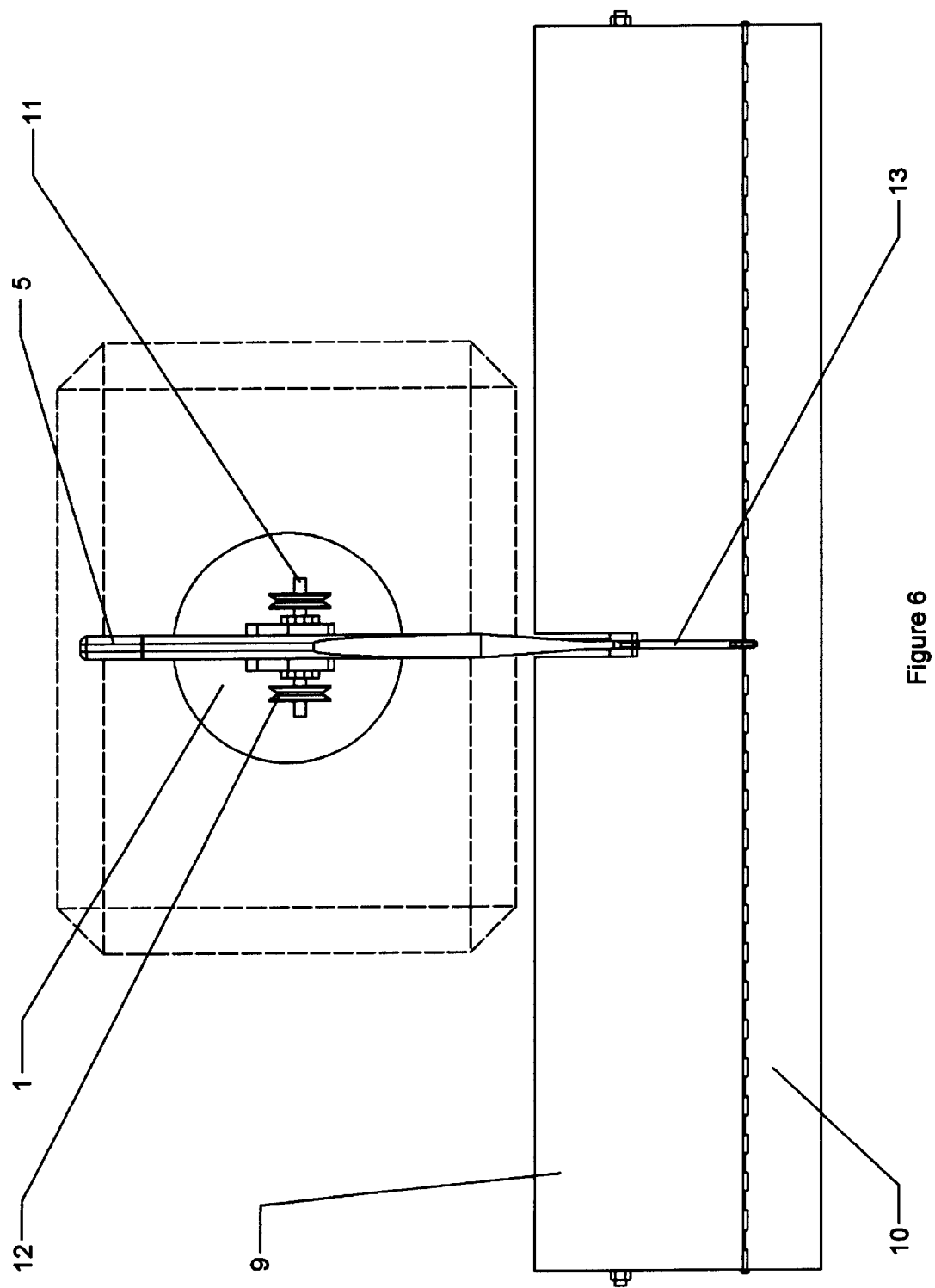
FIG. 6 shows a top view of self-trimming oscillating wing system installed onto a base.
Figure 7:
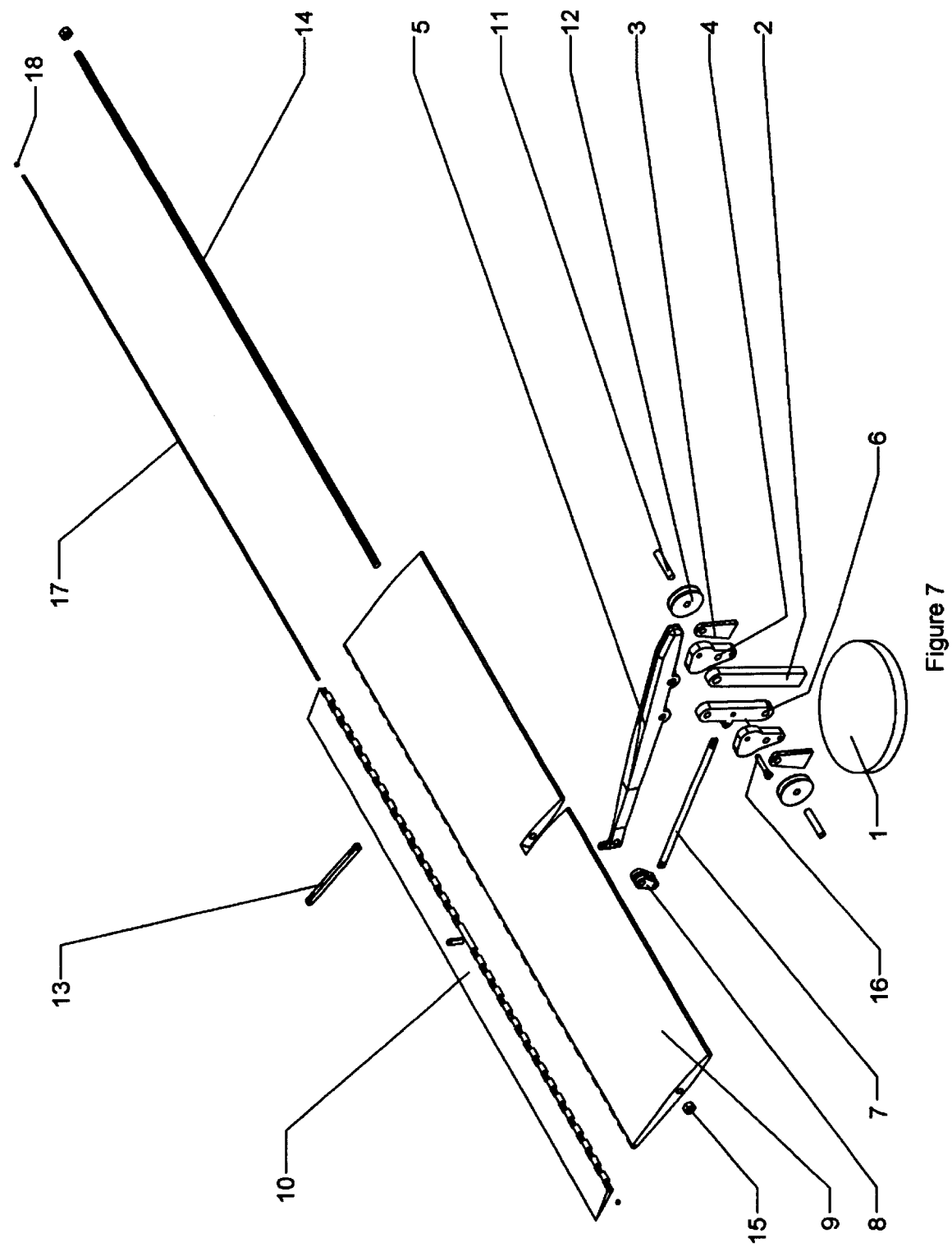
FIG. 7 shows an exploded view of self-trimming oscillating wing system.

The self-trimming oscillating wing system (A) illustrated in FIGS. 1 to 7 comprises a revolving base (1) swivelling according to the direction of the wind, which is connected to a support (2) of lever (5) joined to an oscillating wing (9) by a first fore rod (14) blocked by each locknut (15), and which the second fore rod (17) blocked by each locknut (18) joins an elevon (10) to the oscillating wing (9).

Each support (3) connected to the revolving base (1) allow to join a driving shaft (11) to a tree (6) and to each counterbalance (4), which activate the driving shaft (11) making rotate each feeding pulley (12).

The counterbalances (4) and tree (6) are blocked by a locking means (16) that set the self-trimming oscillating wing system (A) completely inoperational.

A stabilizing bar (7) connected to the tree (6) and to a fixing means (8), is joined to a lever (5) by the first fore rod (14) joining the oscillating wing (9), and an arm (13) connected to fixing means (8) and to the elevon (10), activates the elevon (10) joined to the oscillating wing (9) by the second fore rod (17) blocked by each locknut (18).

Figure 8:
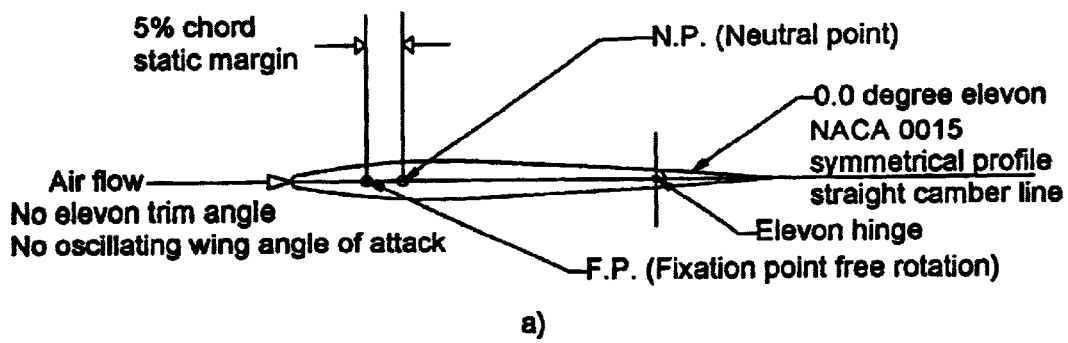
FIG. 8a shows a view of the oscillating wing trimming and stability.
FIGS. 8b and 8c show a view of the oscillating wing trimming showing the elevon producing a control moment that counterbalances the control moment generated by a lift.
Figure 8:
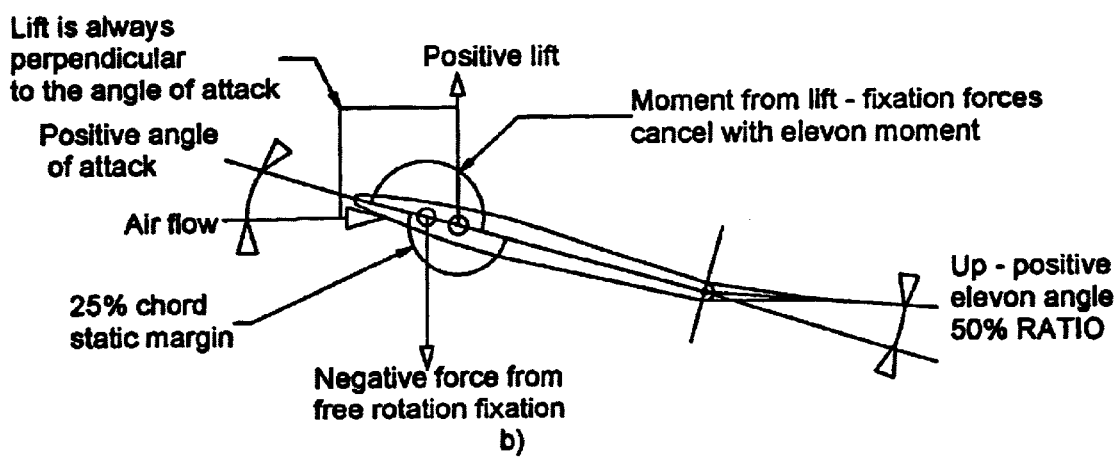
Figure 8:
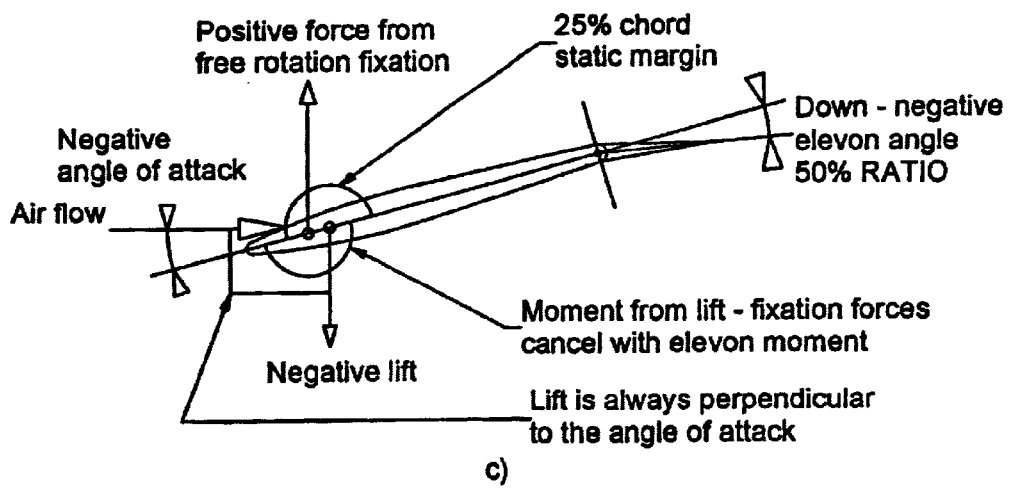

As illustrated in FIG. 8a the oscillating wing profile is totally free to rotate around of its fixation point while that the elevon deflection angle is kept constant with respect to the profile base line. In this case, seeing that the profile is symmetrical, the camber line will be a straight line.

As illustrated in FIGS. 8b and 8c, the elevon produces a control moment that counterbalances the control moment generated by a lift. If an aerodynamic perturbation increases the angle of attack, the control moment increases also, which makes to pivot the profile and move back to its original state of equilibrium. If a perturbation decreases the angle of attack, the control moment decreases also, which results into an unbalanced state with the control moment from the elevon, makes to rotate the profile and move back to its original state of equilibrium.

Figure 9:
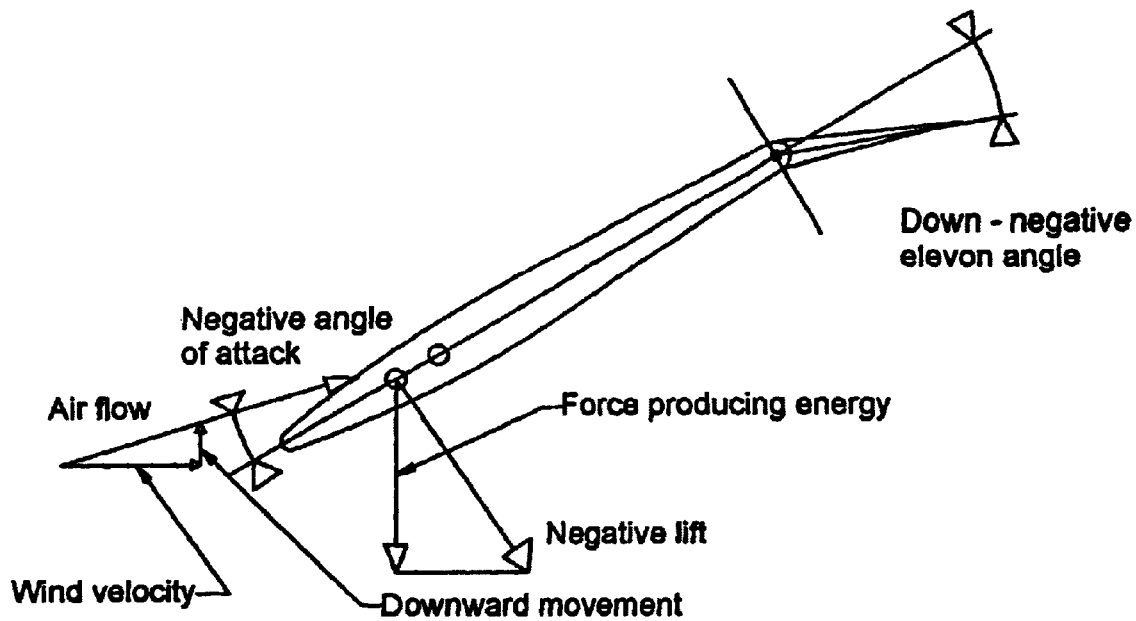
FIGS. 9a and 9b show a view of the oscillating wing electrical energy production with the wind flow.
Figure 9:
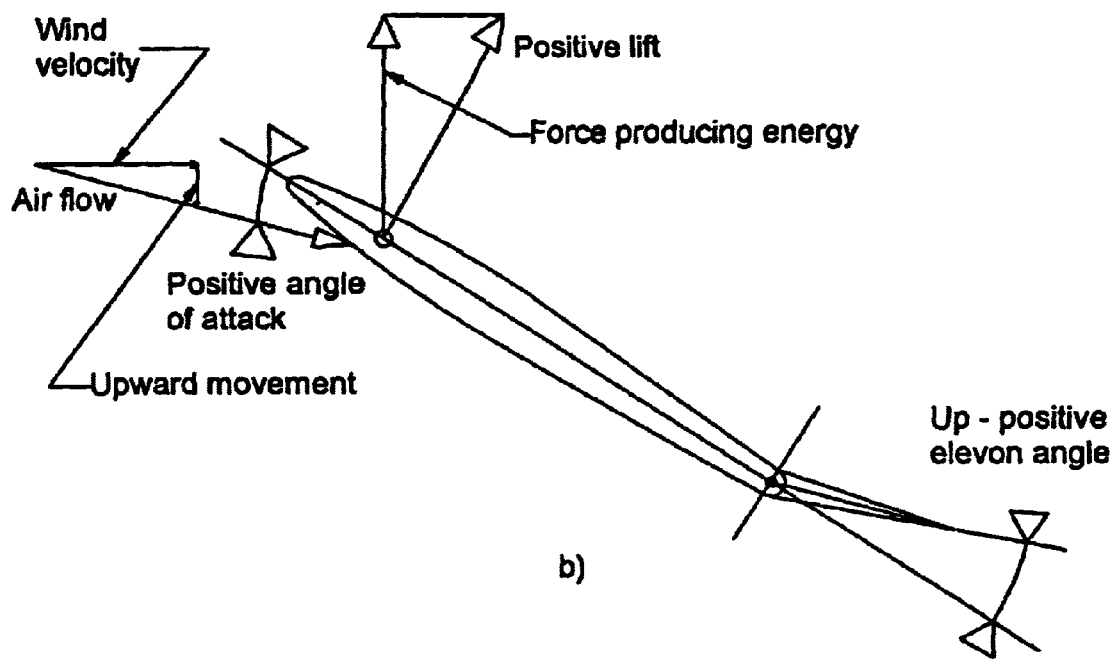
Figure 10:
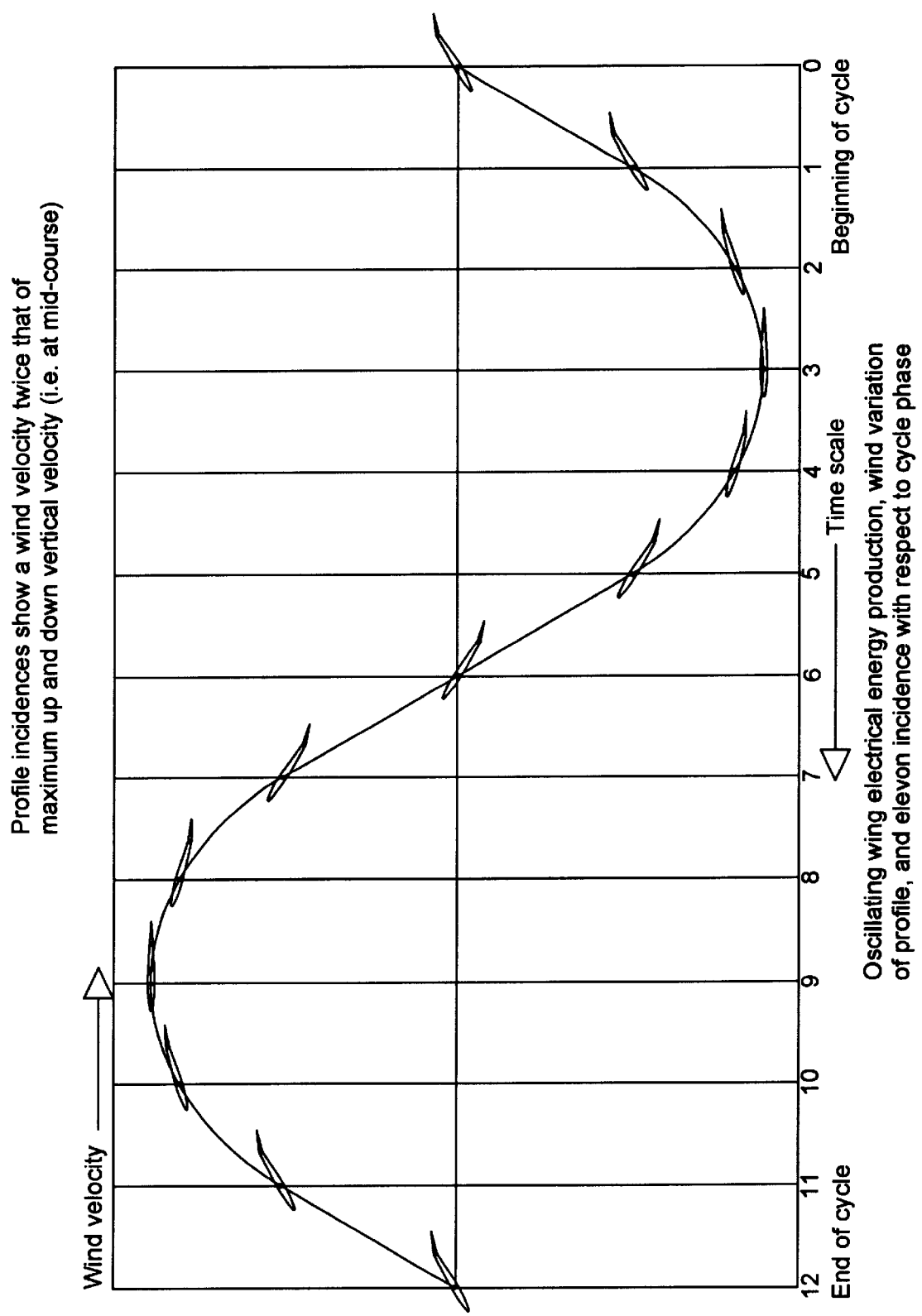
FIG. 10 shows a view of the oscillating wing electrical energy production, wind variation of profile and elevon incidence with respect to cycle phase.

As illustrated in FIGS. 9a, 9b and 10, the oscillating wing system producing electrical energy with the wind flow.

Figure 11:
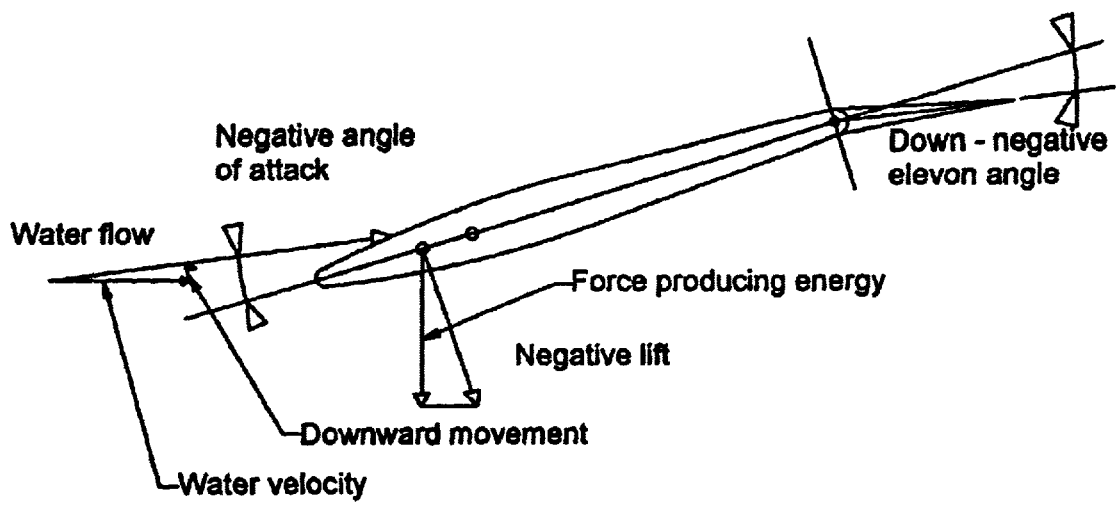
FIGS. 11a and 11b show a view of the oscillating wing electrical energy production with the water flow.
Figure 11:
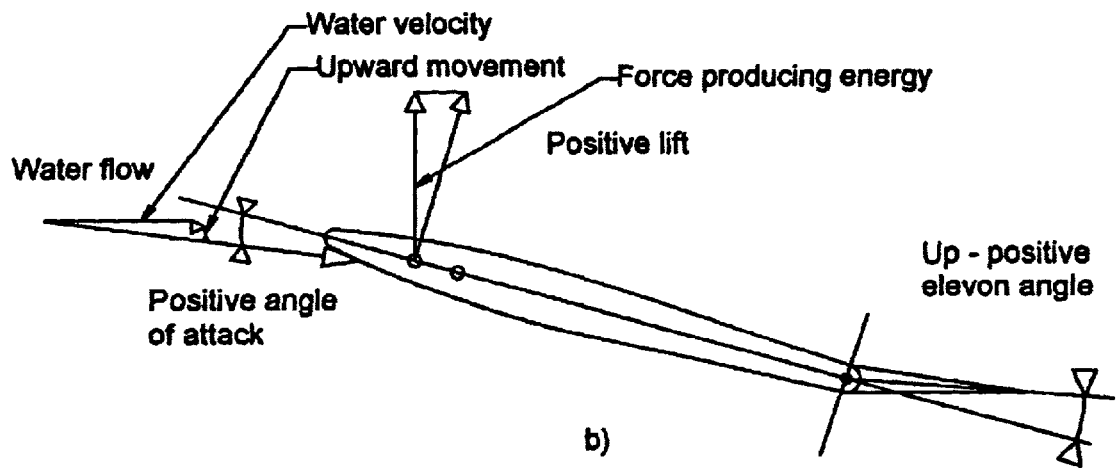
Figure 12:
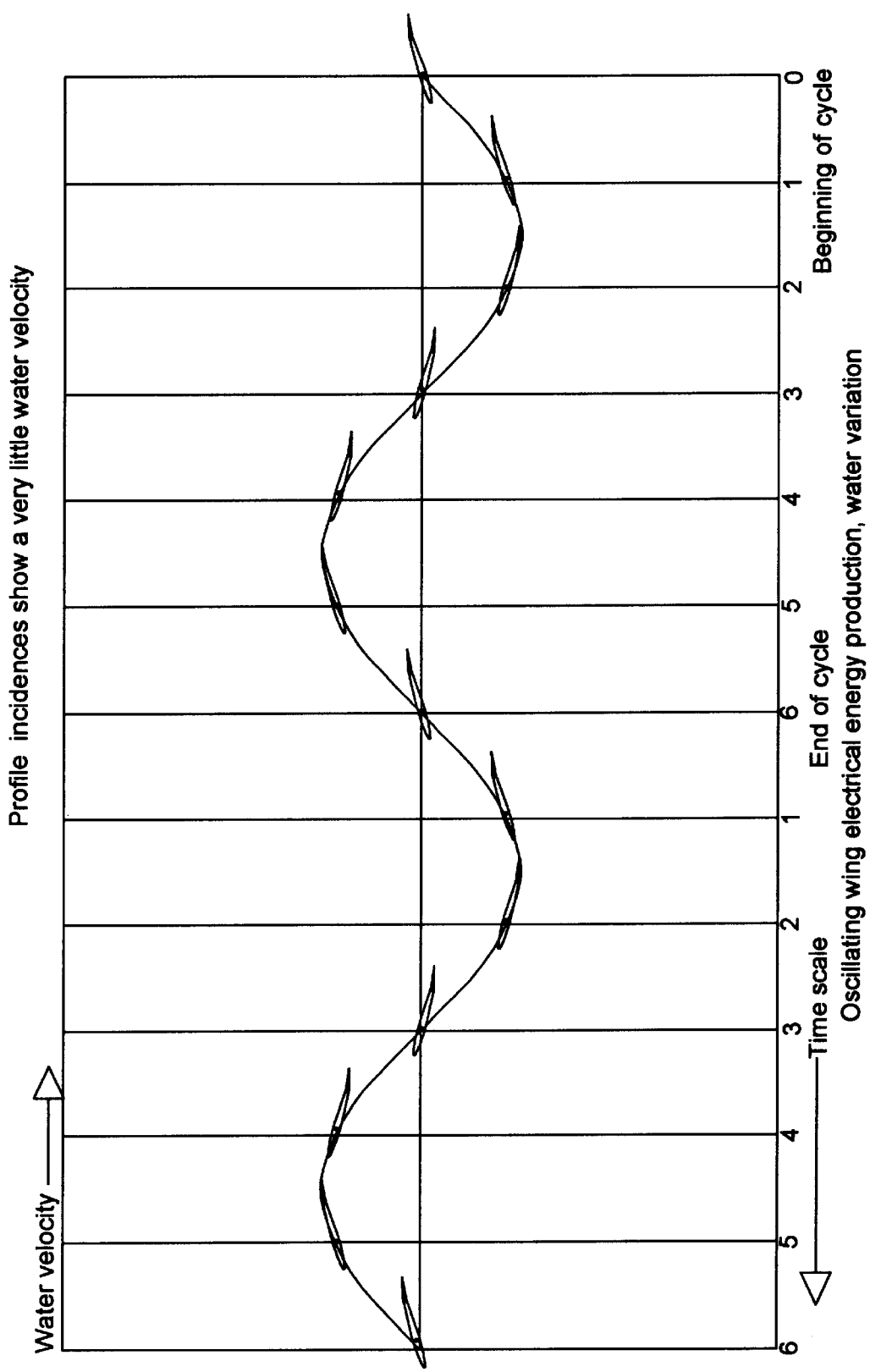
FIG. 12 shows a view of the oscillating wing electrical energy production, water variation of profile and elevon incidence with respect to cycle phase.

As illustrated in FIGS. 11a, 11b and 12, the oscillating wing system producing electrical energy with the water flow.

Although only a single embodiment of the present invention has been described and illustrated, the present invention is not limited to the features of this embodiment, but includes all variations and modifications within the scope of claims.

LEGEND

1: Revolving base
2: Support of lever
3: Support of driving shaft
4: Counterbalance
5: Lever
6: Tree
7: Stabilizing bar
8: Fixing means
9. Oscillating Wing
10: Elevon
11: Driving shaft
12: Feeding pulley
13: Arm activating the elevon
14: First fore rod
15: First locknut
16: Locking means
17: Second fore rod
18: Second locknut The embodiments of the invention for which an exclusive property or privilege is claimed, are defined as follows:

1. A self-trimming oscillating wing system being used for produce electrical energy with the wind flow or water flow of a deep river or at flood/ebb tide, which comprising:

a revolving base swivelling according to the direction of wind;

said revolving base is connected to a support of lever joining an oscillating wing by means of a first fore rod blocked by each first locknut;

a second fore rod blocked by each second locknut, joins an elevon to said oscillating wing;

each support connected to said revolving base allow to join each driving shaft to a tree and to each counterbalance, which activate said driving shaft making rotate each feeding pulley, and when said counterbalances and said tree are blocked by a locking means, said self-trimming oscillating wing system is completely inoperational;

a stabilizing bar connected to said tree and to a fixing means, joins a lever by said first fore rod blocked by said first locknuts joining said oscillating wing to said elevon; and an arm connected to said fixing means and said elevon, activates said elevon joined to said oscillating wing by said second fore rod blocked by said second locknuts.

2. The oscillating wing system of the claim 1 like lifting surface featuring a symmetrical profile, is mounted free to rotate over a fixation point located ahead neutral point and self-trimming at angle of attack in the flow by adjustment of a trailing edge elevon, and whose the system is actuated by linear lateral or vertical movement allowing to produce electrical energy with the wind flow or water flow of a deep river or at flood/ebb tide.

3. The self-stabilizing wing of the claim 2 trims always at same angles of attack related to elevon angles of incidences, whatever the dynamic pressure, the velocity or the direction of incoming flow.

4. The elevon angles of incidences of the claim 3 produces a control moment that counterbalances the control moment generated by a lift, which is always perpendicular to the angle of attack from the oscillating wing.

* * * * *